United States Patent [19]

Matsumoto

[11] Patent Number: 4,695,877
[45] Date of Patent: Sep. 22, 1987

[54] VIDEO SIGNAL PROCESSING APPARATUS FOR COMPENSATING FOR TIME DIFFERENCES BETWEEN LUMINANCE AND CHROMINANCE SIGNALS OF A PAL SYSTEM

[75] Inventor: Tokikazu Matsumoto, Osaka, Japan

[73] Assignee: Matsushita Electric Industrial Co., Ltd., Kadoma, Japan

[21] Appl. No.: 797,034

[22] Filed: Nov. 12, 1985

[30] Foreign Application Priority Data

Dec. 5, 1984 [JP] Japan .............................. 59-256701

[51] Int. Cl.$^4$ .............................................. H04N 5/21
[52] U.S. Cl. ........................................ 358/36; 358/37; 358/328; 358/31
[58] Field of Search ..................... 358/31, 36, 37, 329, 358/328, 314, 21 R, 24

[56] References Cited

U.S. PATENT DOCUMENTS 4,263,612  4/1981  Gibson et al. .......................... 358/31
4,504,853  3/1985  Faroudja ................................ 358/37

Primary Examiner—James J. Groody
Assistant Examiner—Victor R. Kostak
Attorney, Agent, or Firm—Wenderoth, Lind & Ponack

[57] ABSTRACT

A video signal processing apparatus for use in a video tape recorder of the PAL system obtains a composite video signal without causing a vertical color shift on a display screen which would normally be caused by a time difference between a chrominance signal and a luminance signal. The apparatus includes a 1H delay circuit for delaying an input luminance signal by one horizontal synchronizing period (1H), an operational circuit, a 2H comb filter that passes an input chrominance signal, and an adder circuit for adding an output signal of the operational circuit and an output signal of the 2H comb filter so as to thereby obtain the composite video signal. The operational circuit allows an output signal of the 1H delay circuit to pass therethrough when a difference in level between the input luminance signal and the output signal of the 1H delay circuit is larger than a predetermined value, and, when the difference is smaller than the predetermined value, outputs a sum of the two signals.

3 Claims, 4 Drawing Figures

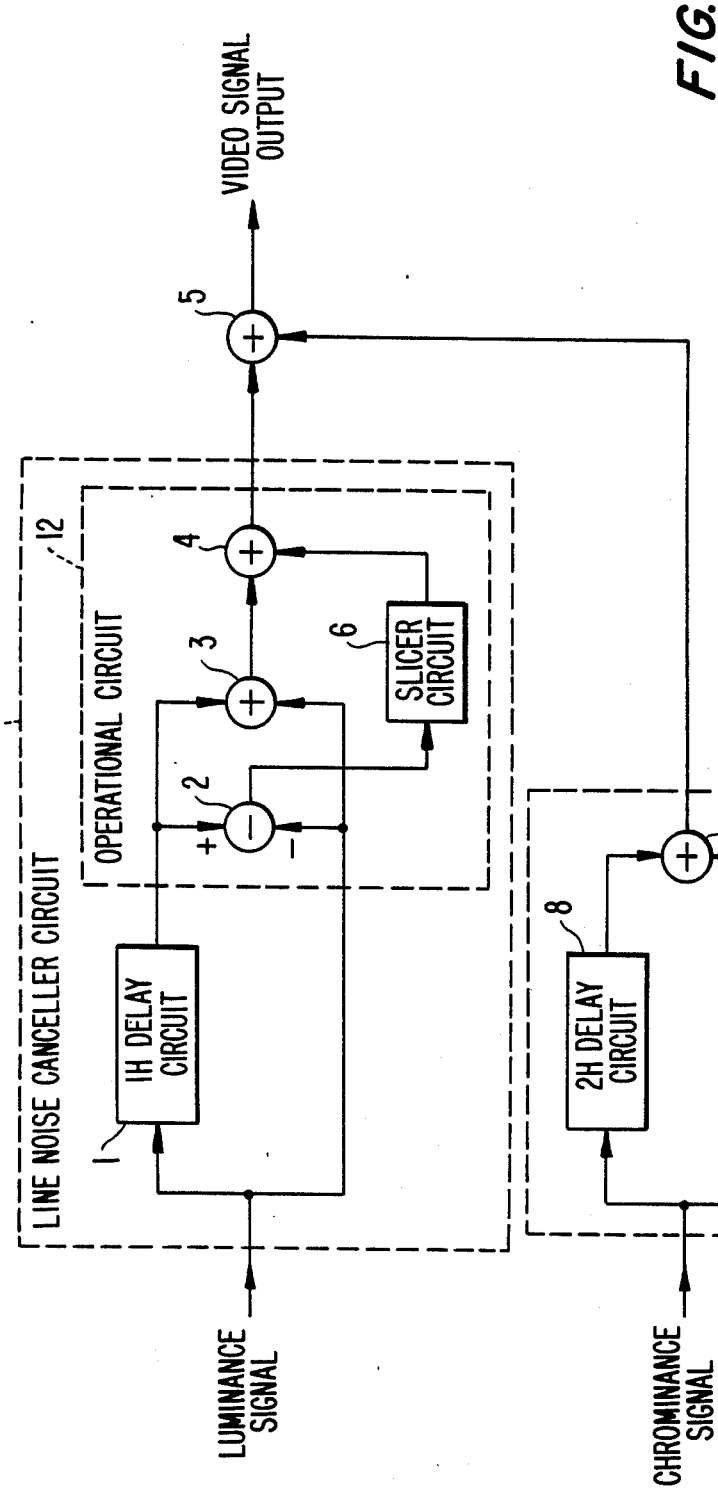

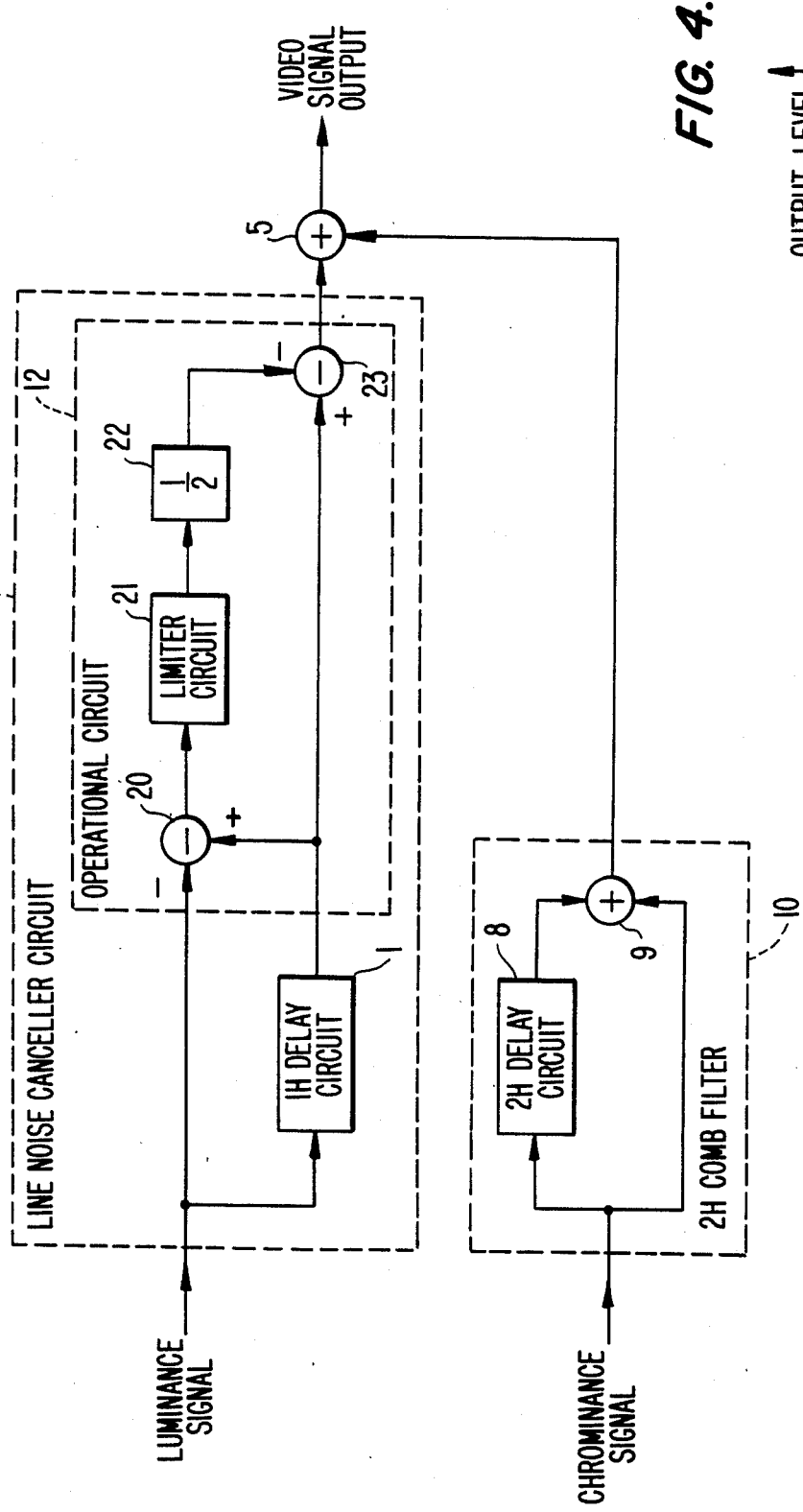
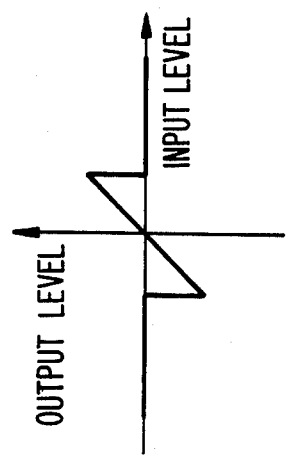

4,695,877

VIDEO SIGNAL PROCESSING APPARATUS FOR COMPENSATING FOR TIME DIFFERENCES BETWEEN LUMINANCE AND CHROMINANCE SIGNALS OF A PAL SYSTEM

BACKGROUND OF THE INVENTION

1. Field of the Invention

The present invention relates to a video signal processing apparatus used in video tape recorders that reproduce signals of the PAL system.

2. Description of the Prior Art

In recent years, there has been an increasing demand for video tape recorders, and improvement in the image quality of video tape recorders of the PAL system has been desired. In a video tape recorder of the PAL system, chrominance signals are passed through a 2H comb filter (where H is the horizontal synchronizing period) to prevent to cause the crosstalk (interferring with signals on adjacent tracks). The chrominance signal passed through the 2H comb filter is delayed by 1H, and therefore the chrominance signal lags the luminance signal, so that an undesirable vertical color shift occurs on the display screen, i.e., the chrominance signal shifts downward with respect to the luminance signal on the screen.

SUMMARY OF THE INVENTION

It is an object of the present invention to provide a video signal processing apparatus capable of preventing the vertical color shift which would normally be caused by passing the chrominance signal through a 2H comb filter when a video signal of the PAL system is processed.

It is another object of the invention to provide a video signal processing apparatus which can suppress noises in the luminance signal.

These objects are achieved by a video signal processing apparatus comprising: 1H delay means for delaying a luminance signal of the PAL system by one horizontal synchronizing period; operational means which outputs an output signal of the 1H delay means when a difference between levels of the luminance signal and the output signal of the 1H delay means is larger than a predetermined value, and outputs a sum of the luminance signal and the output signal of the 1H delay means when the difference is smaller than the predetermined value; a 2H comb filter for passing a chrominance signal of the PAL system; and adder means for adding an output signal of the operational means and an output signal of the 2H comb filter thereby to obtain a video signal.

BRIEF DESCRIPTION OF THE DRAWINGS

FIG. 1 is a block diagram of a first embodiment of a video signal processing apparatus according to the invention;

FIG. 2 is a graph showing an input vs. output characteristic of a slicer circuit used in the embodiment shown in FIG. 1;

FIG. 3 is a block diagram of a second embodiment of a video signal processing apparatus according to the invention; and FIG. 4 is a graph showing an input vs. output characteristic of a limiter circuit used in the embodiment shown in FIG. 3.

DESCRIPTION OF THE PREFERRED EMBODIMENTS

Referring to FIG. 1, there is shown an apparatus embodying the concept of the invention. An input versus output characteristic of a slicer circuit 6 incorporated in this apparatus is shown in FIG. 2. The apparatus has a noise canceller circuit 7 to which a reproduced luminance signal is applied. The circuit noise canceller 7 comprises a 1H delay circuit 1 and an operational circuit 12 which comprises a subtractor circuit 2, adder circuits 3 and 4, and the aforementioned slicer circuit 6.

The operation of the noise canceller circuit 7 will be described. The reproduced luminance signal is delayed by 1H period by the 1H delay circuit 1. The subtractor circuit 2 subtracts the reproduced luminance signal from the output signal of the 1H delay circuit 1. The adder circuit 3 adds the reproduced luminance signal and the output signal of the 1H delay circuit 1. The output signal from the subtractor circuit 2 is applied to the slicer circuit 6 having the input vs. output characteristic shown in FIG. 2. As can be seen from the characteristic shown in FIG. 2, when the level of the input signal to the slicer circuit 6 is low, the slicer circuit 6 blocks the input signal. On the other hand, when the level of the input signal is high, the slicer circuit 6 passes the input signal. The output signal from the subtractor circuit 2 is a difference signal between the luminance signal reproduced 1H before and the present (or latest) reproduced luminance signal, and represents the correlation of 1H. Accordingly, an output signal appears at the output of the slicer circuit 6 only when the vertical correlation of 1H is smaller than a predetermined value. The output signal from the slicer circuit 6 is added to the output signal from the adder circuit 3 by the adder circuit 4.

If the luminance signal is represented by S and the 1H-delayed luminance signal from the 1H delay circuit 1 is represented by $S_H$, then the output signal from the subtractor circuit 2 is $S_H - S$, and the output signal from the adder circuit 3 is $S_H + S$. As already mentioned, the signal $S_H - S$ appears at the output of the slicer circuit 6 only when the 1H vertical correlation of the luminance signal is smaller than a predetermined value. Therefore, the output signal from the adder circuit 4 is $2S_H$ when the correlation is small, and $S_H + S$ when the correlation is larger than the predetermined value. That is, when the correlation is small, the output signal of the operational circuit 12 is delayed by 1H with respect to the reproduced luminance signal. When the correlation is large, the output signal of the operational circuit 12 is the sum of the present luminance signal and the 1H-delayed luminance signal reproduced 1H before, so that the signal-to-noise ratio is enhanced. Although the level of the output luminance signal of the line noise canceller circuit 7 is twice the level of the input luminance signal, the gain may be so controlled as to halve the output level.

A reproduced chrominance signal is passed through a 2H comb filter 10 comprising a 2H delay circuit 8 and an adder circuit 9, to remove crosstalk from the adjacent tracks. Then, the output signal of the 2H comb filter 10 is mixed with the luminance signal from the line noise canceller circuit 7 by an adder circuit 5. As a result, a composite video signal is obtained at the output terminal of the adder circuit 5.

As described above, the luminance signal is delayed by 1H when the vertical correlation is small, and there-after mixed with the chrominance signal delayed by 1H after passed through the 2H comb filter. Hence, the color shift does not occur.

Another embodiment of the invention is shown in FIG. 3. An input vs. output characteristic of a limiter circuit 21 incorporated in the embodiment shown in FIG. 3 is shown in FIG. 4. Referring to FIG. 3, a reproduced luminance signal is supplied to a line noise canceller circuit 7 comprising a 1H delay circuit 1 and an operational circuit 12. This operational circuit 12 comprises subtractor circuits 20 and 23, the aforementioned limiter circuit 21, and a coefficient circuit (labeled ½ in tne figure) 22.

The operation of the embodiment shown in FIG. 3 will be described. The reproduced luminance signal is delayed by 1H period by means of the 1H delay circuit 1 to obtain a 1H-delayed luminance signal. The subtractor circuit 20 subtracts the reproduced luminance signal from the 1Hdelayed luminance signal. The output signal from the subtractor circuit 20 is passed through the limiter circuit 21 having the input vs. output characteristic shown in FIG. 4, and then the amplitude of the output signal of the limiter circuit 21 is halved by the coefficient circuit 22. The subtractor circuit 23 subtracts the output signal of the coefficient circuit 22 from the output signal of the 1H delay circuit 1. Now, let S and $S_H$ be the reproduced luminance signal and the 1H-delayed luminance signal from the 1H delay circuit 1, respectively. When the amplitude of the output signal of the subtractor circuit 20 is small enough to pass the limiter circuit 21, the output signal of the coefficient circuit 22 is $S_H/2 - S/2$. Thus, the output signal from the subtractor circuit 23 is $S_H/2 + S/2$. When the amplitude of the output signal of the subtractor circuit 20 is too large to be allowed to pass the limiter circuit 21, the output signal of the subtractor ciruict 23 is S. Accordingly, in the same manner as the embodiment of FIG. 1, when the vertical correlation is small, the output signal of the operational circuit 12 is delayed by 1H with respect to the reproduced luminance signal, and, when the correlation is large, the present luminance signal is added with the 1H-delayed luminance signal reproduced 1H before so that the signal-to-noise ratio is enhanced.

On the other hand, a reproduced chrominance signal is passed through a 2H comb filter 10 comprising a 2H delay circuit 8 and an adder circuit 9, to remove crosstalk from the adjacent tracks. Then, the chrominance signal after passed through the 2H comb filter 10 is mixed with the luminance signal outputted from the line noise canceller circuit 7, the resultant signal being a composite video signal.

In this composite video signal, since the luminance signal is delayed by 1H when the vertical correlation is small, and the chrominance signal is also delayed by 1H after passed through the 2H comb filter, the color shift does not occur.

What is claimed is:

1. A video signal processing apparatus for compensating for time differences between luminance and chrominance signals of a PAL system comprising:
   a 1H delay means for delaying a luminance signal of the PAL system by one horizontal synchronizing period;
   an operational means for allowing an output signal of said delay means to pass therethrough when a difference between levels of said luminance signal and said output signal of said delay means is larger than a predetermined value, and for outputting a sum of said luminance signal and said output signal of said delay means when said difference is smaller than said predetermined value;
   a 2H comb filter for passing a chrominance signal of the PAL system; and
   an adder means for adding an output signal of said operational means and an output signal of said 2H comb filter so as to thereby obtain a video signal.

2. A video signal processing apparatus for compensating for time differences between luminance and chrominance signals of a PAL system comprising:
   a 1H delay means for delaying a luminance signal of the PAL system by one horizontal synchronizing period;
   an operational means for allowing an output signal of said delay means to pass therethrough when a difference between levels of said luminance signal and said output signal of said delay means is larger than a predetermined value, and for outputting a sum of said luminance signal and said output signal of said delay means when said difference is smaller than a predetermined value;
   a 2H comb filter for passing a chrominance signal of the PAL system; and
   an adder means for adding an output signal of said operational means and an output signal of said 2H comb filter so as to thereby obtain a video signal;
   wherein said operational means comprises: a first subtractor circuit for subtracting said luminance signal from said output signal of said 1H delay means; a first adder circuit for adding said output signal of said 1H delay means and said luminance signal; a slicer circuit which does not pass an output signal of said first subtractor circuit when a level of said output signal of said first subtractor circuit is lower than said predetermined value, and passes said output signal of said first subtractor circuit only when said level is higher than said predetermined value; and a second adder circuit for adding an output signal of said slicer circuit and an output signal of said first adder circuit.

3. A video signal processing apparatus for compensating for time differences between luminance and chrominance signals of a PAL system comprising:
   a 1H delay means for delaying a luminance signal of the PAL system by one horizontal synchronizing period;
   an operational means for allowing an output signal of said delay means to pass therethrough when a difference between levels of said luminance signal and said output signal of said delay means is larger than a predetermined value, and for outputting a sum of said luminance signal and said output signal of said delay means when said difference is smaller than said predetermined value;
   a 2H comb filter for passing a chrominance signal of the PAL system; and
   an adder means for adding an output signal of said operational means and an output signal of said 2H comb filter so as to thereby obtain a video signal;
   wherein said operational means comprises: a first subtractor circuit for subtracting said luminance signal from said output signal of said 1H delay means; a limiter circuit for liminting a level of an output signal of said first subtractor circuit; a coefficient circuit for halving a level of an output signal of said limiter circuit; and a second subtractor circuit for subtracting an output signal of said coefficient circuit from said output signal of said 1H delay means.

* * * * *